United States Patent
Harada

(10) Patent No.: US 12,311,542 B2
(45) Date of Patent: May 27, 2025

(54) ROBOT SYSTEM

(71) Applicant: FANUC CORPORATION, Yamanashi (JP)

(72) Inventor: Kunihiko Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 244 days.

(21) Appl. No.: 18/002,434

(22) PCT Filed: Jul. 27, 2021

(86) PCT No.: PCT/JP2021/027743
§ 371 (c)(1),
(2) Date: Dec. 19, 2022

(87) PCT Pub. No.: WO2022/025059
PCT Pub. Date: Feb. 3, 2022

(65) Prior Publication Data
US 2023/0278196 A1 Sep. 7, 2023

(30) Foreign Application Priority Data
Jul. 29, 2020 (JP) ................. 2020-127932

(51) Int. Cl.
*B25J 9/10* (2006.01)
*B25J 9/16* (2006.01)

(52) U.S. Cl.
CPC ............. *B25J 9/10* (2013.01); *B25J 9/1664* (2013.01)

(58) Field of Classification Search
CPC ... B25J 9/10; B25J 9/161; B25J 9/1664; B25J 9/1692; G05B 2219/39055
See application file for complete search history.

(56) References Cited

U.S. PATENT DOCUMENTS

| 4,403,281 A * | 9/1983 | Holmes .................... B25J 9/161 |
| | | 318/568.25 |
| 4,763,276 A * | 8/1988 | Perreirra ................ B25J 9/1653 |
| | | 700/262 |

(Continued)

FOREIGN PATENT DOCUMENTS

| DE | 69735269 T2 * | 7/2006 | ............. B25J 13/06 |
| DE | 102008043182 A1 * | 4/2009 | ........... G05B 19/409 |

(Continued)

OTHER PUBLICATIONS

"Proposal of position error compensation method that enables immediate work when replacing industrial robots;" Yamaguchi et al.; 2021 IEEE International Conference on Intelligence and Safety for Robotics (ISR) (2021, pp. 342-345); Mar. 4, 2021. (Year: 2021).*

(Continued)

*Primary Examiner* — Bao Long T Nguyen
*Assistant Examiner* — Jorge O Peche
(74) *Attorney, Agent, or Firm* — Studebaker Brackett PLLC

(57) ABSTRACT

Provided is a robot system with which it is possible to easily set an error parameter. The robot system according to an embodiment of the present disclosure comprises a robot, a measurement device attached to an end of the robot, a target mark fixed to a work space for the robot, and a robot control device for controlling the robot. The robot control device has: a parameter storage unit for storing a plurality of error parameters used to calculate the position of a reference point for the end of the robot; a command value generation unit for generating a command value indicating a required position or speed of a drive shaft of the robot, upon taking an error parameter into account; a position information acquisition unit for acquiring position information for the reference point on the basis of the relative position of the target mark (Continued)

measured by the measurement device relative to the measurement device and coordinate information for the target mark in a user coordinate system; and a parameter correction unit for correcting an error parameter on the basis of the command value and the position information.

6 Claims, 2 Drawing Sheets

(56) References Cited

U.S. PATENT DOCUMENTS

| | | | | | |
|---|---|---|---|---|---|
| 4,831,549 | A | * | 5/1989 | Red | G05B 19/4182 700/254 |
| 4,852,018 | A | * | 7/1989 | Grossberg | G05B 19/414 706/904 |
| 5,083,073 | A | * | 1/1992 | Kato | B25J 9/1697 700/254 |
| 5,177,563 | A | * | 1/1993 | Everett | B25J 19/021 356/621 |
| 5,347,616 | A | * | 9/1994 | Minami | B25J 9/162 701/1 |
| 5,716,310 | A | * | 2/1998 | Polacek | B23Q 3/15713 483/53 |
| 5,751,917 | A | * | 5/1998 | Kim | H05K 13/089 700/254 |
| 5,781,705 | A | * | 7/1998 | Endo | B25J 9/1643 318/568.22 |
| 6,249,285 | B1 | * | 6/2001 | Madden | G06V 10/147 345/419 |
| 6,269,283 | B1 | * | 7/2001 | Shinozaki | G05B 19/409 700/172 |
| 6,364,888 | B1 | * | 4/2002 | Niemeyer | A61B 34/37 348/E13.016 |
| 6,467,673 | B2 | * | 10/2002 | Enokido | B23K 20/004 228/180.5 |
| 6,476,574 | B1 | * | 11/2002 | Nilsson | A01J 5/0175 318/567 |
| 6,645,196 | B1 | * | 11/2003 | Nixon | A61B 34/37 606/1 |
| 6,668,466 | B1 | * | 12/2003 | Bieg | G01B 5/008 33/503 |
| 8,180,487 | B1 | * | 5/2012 | Vangal-Ramamurthy | B25J 9/1692 318/567 |
| 9,586,321 | B2 | * | 3/2017 | Maruyama | B25J 13/085 |
| 10,059,003 | B1 | * | 8/2018 | Linnell | B25J 9/1664 |
| 10,065,312 | B1 | * | 9/2018 | Ross | B25J 9/1628 |
| 10,406,692 | B2 | * | 9/2019 | Noda | B25J 9/0084 |
| 11,230,013 | B2 | * | 1/2022 | Wang | B25J 9/1692 |
| 11,267,132 | B2 | * | 3/2022 | Okamoto | G06F 3/0346 |
| 2004/0172168 | A1 | * | 9/2004 | Watanabe | G05B 19/425 700/264 |
| 2004/0254677 | A1 | * | 12/2004 | Brogardh | G05B 19/425 700/250 |
| 2005/0137751 | A1 | * | 6/2005 | Cox | H01L 21/67259 700/254 |
| 2007/0075055 | A1 | * | 4/2007 | Komatsu | B23K 26/0884 219/121.81 |
| 2007/0228592 | A1 | * | 10/2007 | Dunn | B29C 64/106 264/113 |
| 2009/0038258 | A1 | * | 2/2009 | Pivac | E04G 21/22 901/1 |
| 2009/0174357 | A1 | * | 7/2009 | Iwashita | H02P 29/50 318/629 |
| 2010/0168915 | A1 | * | 7/2010 | Kagawa | B25J 9/1692 901/41 |
| 2011/0288677 | A1 | * | 11/2011 | Meidar | B25J 9/047 483/62 |
| 2012/0123441 | A1 | * | 5/2012 | Au | A61B 34/30 606/130 |
| 2012/0197573 | A1 | * | 8/2012 | Pecher | B25J 9/1692 702/89 |
| 2012/0239194 | A1 | * | 9/2012 | Kagawa | B25J 9/1692 700/254 |
| 2013/0041505 | A1 | * | 2/2013 | Cox | H01L 21/67742 901/29 |
| 2013/0096718 | A1 | * | 4/2013 | Friedman | G05B 19/401 700/254 |
| 2014/0229005 | A1 | * | 8/2014 | Suzuki | B25J 9/1692 700/254 |
| 2014/0236565 | A1 | * | 8/2014 | Kuwahara | B25J 9/1671 703/22 |
| 2015/0052767 | A1 | * | 2/2015 | Sagemueller | B23Q 17/225 33/503 |
| 2016/0008983 | A1 | * | 1/2016 | Osaka | B25J 9/1692 700/254 |
| 2016/0089789 | A1 | * | 3/2016 | Sato | B25J 13/088 700/254 |
| 2016/0140734 | A1 | * | 5/2016 | Kato | G06T 7/001 348/222.1 |
| 2016/0279800 | A1 | * | 9/2016 | Onda | B25J 9/1692 |
| 2016/0361818 | A1 | * | 12/2016 | Hiruma | B25J 9/1692 |
| 2017/0016712 | A1 | * | 1/2017 | Suzuki | G01B 11/14 |
| 2017/0066130 | A1 | * | 3/2017 | Corkum | B25J 9/1676 |
| 2017/0168586 | A1 | * | 6/2017 | Sinha | G06N 20/00 |
| 2018/0004188 | A1 | * | 1/2018 | Yamaguchi | B25J 9/16 |
| 2018/0126553 | A1 | * | 5/2018 | Corkum | B25J 9/1697 |
| 2018/0169854 | A1 | * | 6/2018 | Shiratsuchi | B25J 11/0095 |
| 2018/0178388 | A1 | * | 6/2018 | Ishige | B25J 9/1692 |
| 2018/0178389 | A1 | * | 6/2018 | Aiso | B25J 9/1692 |
| 2018/0304467 | A1 | * | 10/2018 | Matsuura | B25J 13/06 |
| 2019/0008599 | A1 | * | 1/2019 | Lynch | A61B 34/30 |
| 2019/0054619 | A1 | * | 2/2019 | Mönnich | B25J 9/163 |
| 2019/0143513 | A1 | * | 5/2019 | Rabindran | B25J 9/1607 700/245 |
| 2019/0160583 | A1 | * | 5/2019 | Matthews | B23K 9/0953 |
| 2019/0329409 | A1 | * | 10/2019 | Yamada | B25J 9/1661 |
| 2020/0016757 | A1 | * | 1/2020 | Sakuramoto | B25J 13/08 |
| 2020/0078947 | A1 | * | 3/2020 | Wang | B25J 9/1692 |
| 2020/0182743 | A1 | * | 6/2020 | Diolaiti | G05B 19/0426 |
| 2020/0206924 | A1 | * | 7/2020 | Pivac | B25J 9/1651 |
| 2020/0238519 | A1 | * | 7/2020 | Diankov | B25J 9/1697 |
| 2020/0238536 | A1 | * | 7/2020 | Okamoto | B25J 13/00 |
| 2020/0376672 | A1 | * | 12/2020 | Wolf | G01B 11/24 |
| 2020/0384650 | A1 | * | 12/2020 | Shimoyama | B25J 19/022 |
| 2021/0043484 | A1 | * | 2/2021 | Moura | G06T 7/001 |
| 2021/0046645 | A1 | * | 2/2021 | Dupuis | B25J 9/1635 |
| 2021/0129328 | A1 | * | 5/2021 | Pipe-Mazo | B25J 9/0084 |
| 2021/0129329 | A1 | * | 5/2021 | Pipe-Mazo | B25J 9/126 |
| 2021/0129330 | A1 | * | 5/2021 | Pipe-Mazo | B25J 9/16 |
| 2021/0129339 | A1 | * | 5/2021 | Pipe-Mazo | B25J 13/088 |
| 2021/0173374 | A1 | * | 6/2021 | Ozeki | G05B 19/18 |
| 2021/0291362 | A1 | * | 9/2021 | Pivac | G05D 1/0248 |
| 2021/0370509 | A1 | * | 12/2021 | Pivac | G05B 19/4155 |
| 2022/0297296 | A1 | * | 9/2022 | Kondapally | B25J 9/1612 |
| 2023/0065638 | A1 | * | 3/2023 | Kuan | H01L 21/67745 |
| 2023/0109495 | A1 | * | 4/2023 | Macy | G05B 19/4099 700/254 |
| 2023/0211499 | A1 | * | 7/2023 | Wakabayashi | G05B 19/423 700/245 |
| 2023/0234225 | A1 | * | 7/2023 | Harada | B25J 9/1692 700/245 |
| 2023/0278196 | A1 | * | 9/2023 | Harada | B25J 9/161 700/245 |
| 2024/0009849 | A1 | * | 1/2024 | Huang | B25J 9/1692 |
| 2024/0066712 | A1 | * | 2/2024 | Gao | A61B 17/34 |
| 2024/0091940 | A1 | * | 3/2024 | Harada | B25J 9/04 |

FOREIGN PATENT DOCUMENTS

| | | | | |
|---|---|---|---|---|
| DE | 102010007591 A1 | * | 8/2011 | ........ B23Q 17/2233 |
| DE | 10 2016 116 702 B4 | | 1/2019 | |
| DE | 10 2017 212 261 A1 | | 1/2019 | |
| DE | 112017005958 T5 | * | 8/2019 | ............ B25J 13/08 |
| DE | 102010064652 B3 | * | 3/2023 | ............ B23Q 17/22 |
| EP | 0 114 505 B1 | | 5/1987 | |
| EP | 301527 A | * | 2/1989 | ............ B25J 9/1692 |
| EP | 0353585 A2 | * | 7/1989 | |
| JP | H04-259007 A | | 9/1992 | |
| JP | H07121214 A | * | 5/1995 | |

(56) References Cited

FOREIGN PATENT DOCUMENTS

| JP | H09225872 A | * | 9/1997 | |
|---|---|---|---|---|
| JP | H1094945 A | * | 4/1998 | |
| JP | 2001189342 A | * | 7/2001 | ........... B23K 20/004 |
| JP | 2020-040165 A | | 3/2020 | |
| JP | 2020089970 A | * | 6/2020 | ............. B25J 9/161 |
| KR | 0176662 B1 | * | 4/1999 | |
| WO | 2015/162334 A1 | | 10/2015 | |
| WO | 2018/092243 A1 | | 5/2018 | |

OTHER PUBLICATIONS

"Position Calibration Method for Large size Industrial Robots Based on Random Forest;" Kato et al.; 2021 21st International Conference on Control, Automation and Systems (ICCAS) (2021, pp. 607-612); Oct. 12, 2021. (Year: 2021).*
"Improvement of Robot Accuracy with an Optical Tracking System;" Liu et al., Sensors (Basel, Switzerland), 20(21), 6341; Nov. 6, 2020. (Year: 2020).*
International Search Report issued in PCT/JP2021/027743; mailed Oct. 12, 2021.

* cited by examiner

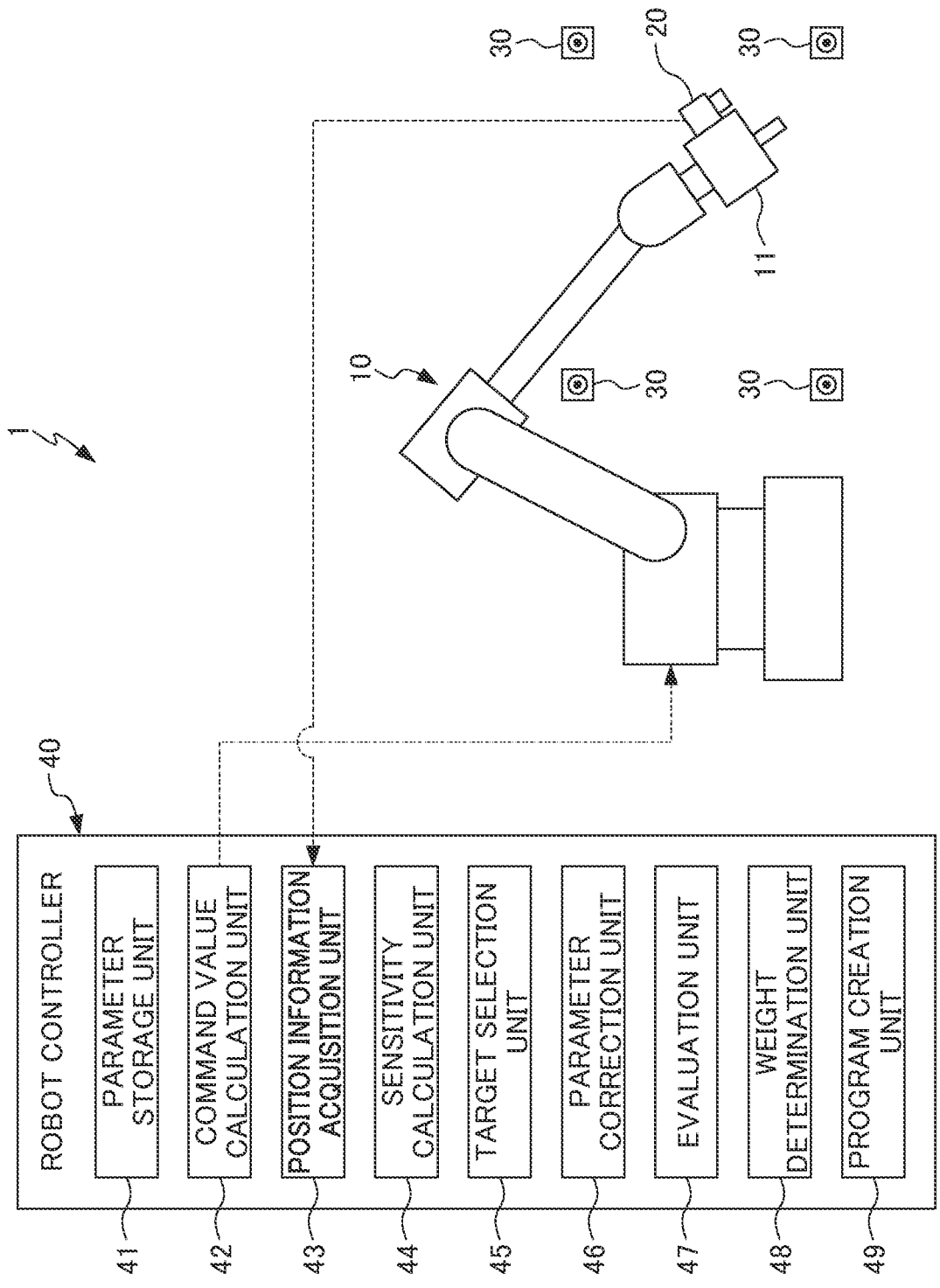

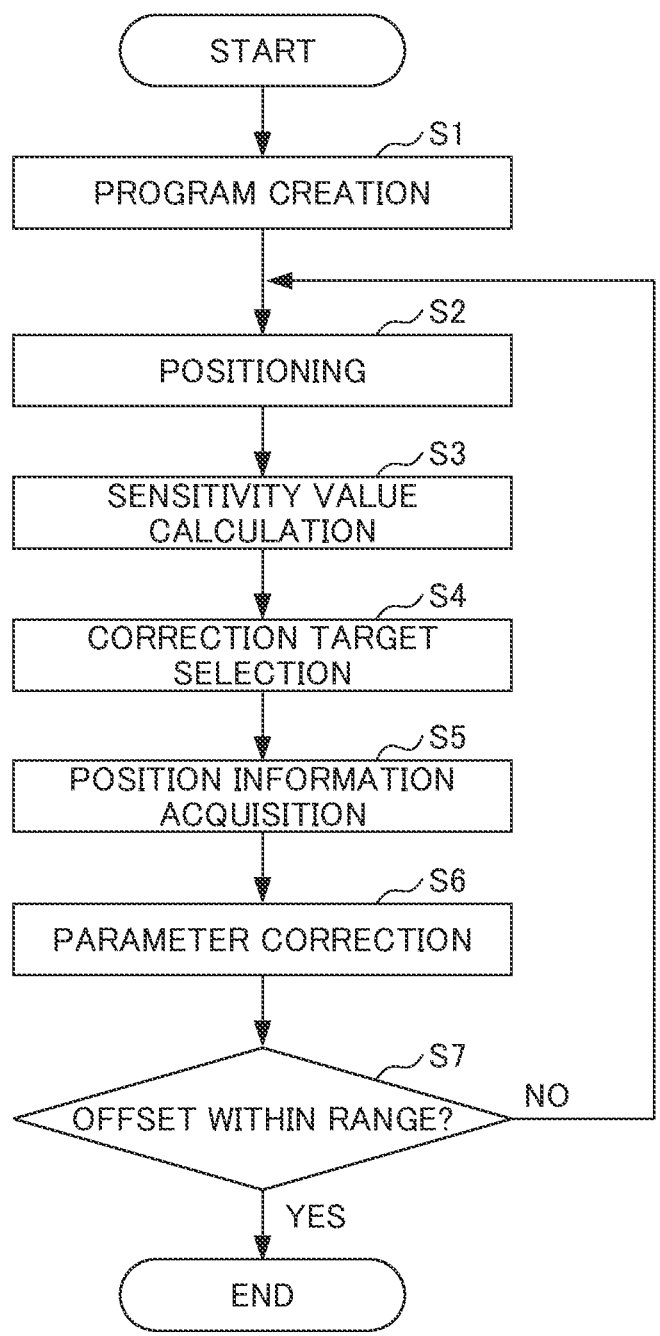

ROBOT SYSTEM

TECHNICAL FIELD

The present invention relates to a robot system.

BACKGROUND ART

In an articulated robot having a plurality of drive axes, the position of a reference point at a distal end of the robot is calculated based on the distance between the drive axes (link length) and the angular positions of the drive axes. However, in an actual robot, various factors can cause an error between a position of the reference point calculated from angle command values for the drive axes and a position of the reference point actually positioned. It has been therefore contemplated to compensate for an error between a theoretical position of the reference point corresponding to the command values for the robot and an actual position of the reference point, using a plurality of error parameters. For this purpose, it has been proposed to install a three-dimensional measurement device to measure the actual position of the reference point (see, for example, Patent Document 1).
Patent Document 1: Japanese Unexamined Patent Application, Publication No. 2020-40165

DISCLOSURE OF THE INVENTION

Problems to be Solved by the Invention

An articulated robot has a large number of error factors. Setting error parameters for each of the error factors therefore requires a significant number of error parameters. Furthermore, the error parameters do not work independently from one another, but are interrelated to affect the final positioning error. If all of the large number of error parameters are unknown variables, the values of the error parameters cannot be calculated without actually measuring positioning errors for an extremely large number of postures of the robot. The use of one three-dimensional measurement device alone potentially leads to a position measurement failure because, depending on the posture of the robot, the reference point at the distal end may be hidden behind another component of the robot or leads to an increase in measurement error with an increase in distance between the three-dimensional measurement device and the reference point. The use of a plurality of three-dimensional measurement devices requires consideration of a difference between coordinate systems of the three-dimensional measurement devices and effects of measurement errors. Thus, there is a demand for a robot system that makes it possible to easily set error parameters with which the position of a reference point of a robot can be accurately calculated.

Means for Solving the Problems

A robot system according to an aspect of the present disclosure includes: a robot having a plurality of drive axes; a measurement device attached to a distal end of the robot; a target mark fixed in a workspace of the robot; and a robot controller configured to control the robot. The robot controller includes: a parameter storage unit configured to store therein a plurality of error parameters to be used to calculate a position of a reference point at the distal end of the robot; a command value calculation unit configured to calculate command values for giving the robot a desired position or speed of each of the drive axes by taking into account the error parameters; a position information acquisition unit configured to acquire position information of the reference point based on a relative position of the target mark to the measurement device measured by the measurement device and a coordinate position of the target mark in a user coordinate system for specifying motions of the robot; and a parameter correction unit configured to correct for the error parameters based on the command values and the position information.

Effects of the Invention

A robot system according to the present disclosure makes it possible to easily set error parameters with which the position of a reference point of a robot can be accurately calculated.

BRIEF DESCRIPTION OF THE DRAWINGS

FIG. 1 is a diagram illustrating a configuration of a robot system according to an embodiment of the present disclosure; and FIG. 2 is a flowchart showing procedures of error parameter correction in the robot system in FIG. 1.

PREFERRED MODE FOR CARRYING OUT THE INVENTION

The following describes an embodiment of the present disclosure with reference to the drawings. FIG. 1 is a diagram illustrating a configuration of a robot system 1 according to the embodiment of the present disclosure.

The robot system 1 includes a robot 10, a measurement device 20, a target mark 30, and a robot controller 40.

The robot 10 has a plurality of drive axes. Typically, the robot 10 is a vertical articulated robot, but may be another type of robot such as a SCARA robot, a parallel-link robot, or a Cartesian coordinate robot. A work head 11 corresponding to a desired task, such as a machining head for machining a workpiece or a holding head for holding a workpiece, is attached to a distal end of the robot 10.

The measurement device 20 is attached to the distal end of the robot 10. The measurement device 20 may be fixed to the work head 11, which is attached to the distal end of the robot 10, or may be fixed to a distal end link to which the work head 11 is attached.

Examples of devices usable as the measurement device 20 include: a three-dimensional laser scanner that measures the three-dimensional shape of a surface of an object using, for example, a laser; a three-dimensional vision sensor that calculates, based on parallax between images captured by two cameras, the distance to a subject for each of planar positions; and a two-dimensional camera that calculates a three-dimensional relative position of a subject to the measurement device 20 based on a prestored target image and size thereof. The measurement device 20 is also usable as a sensor for checking workpieces while the robot system 1 is in operation.

The target mark 30 is fixed in a workspace of the robot 10, and a coordinate position thereof is identified in advance in a user coordinate system for specifying motions of the robot 10. The robot system 1 measures the position and the orientation of a reference point at the distal end of the robot in the user coordinate system for specifying motions of the robot 10, based on the known coordinate position of the target mark 30 and the relative position between the target mark 30 and the measurement device 20.

Preferably, the robot system 1 includes a plurality of target marks 30 distributed in the workspace so that the measurement device 20 can measure relative positions between the target marks 30 and the measurement device 20 for various postures of the robot 10.

Preferably, each of the target marks 30 has a symmetrical shape, such as a spherical shape or a cubical shape, that allows the measurement device 20 to identify a center position of the target mark 30 from any direction. More preferably, each of the target marks 30 has a shape or pattern that allows the measurement device 20 to recognize the orientation of the target mark 30. The expression "shape or pattern" encompasses a case where each target mark 30 has both a shape and a pattern. An approximate orientation of each target mark 30 can be identified based on the posture of the robot 10. The target marks 30 may therefore have any shape or pattern as long as the shape or pattern includes feature points indicating orientation at regular angular intervals.

The robot controller 40 controls the robot 10. The robot controller 40 may have a configuration including a parameter storage unit 41, a command value calculation unit 42, a position information acquisition unit 43, a sensitivity calculation unit 44, a target selection unit 45, a parameter correction unit 46, an evaluation unit 47, a weight determination unit 48, and a program creation unit 49.

The robot controller 40 may be implemented by introducing an appropriate control program into a computer device having, for example, a CPU and memory. The elements of configuration mentioned above are separated in terms of functions of the robot controller 40, but do not have to be clearly distinguishable from one another by function or program structure.

The parameter storage unit 41 stores therein a plurality of error parameters to be used to calculate an exact position of the reference point at the distal end of the robot 10 from command values for directing a desired position or speed of each of the drive axes of the robot 10. The error parameters are set to compensate for the difference between a theoretically calculated position (theoretical position) of the reference point and an actually measured position (actual position) of the reference point. The theoretical position is calculated based on, for example, the angle of each drive axis of the robot 10 and the distance between the drive axes. The actual position results from any mechanical error of the robot 10.

The command value calculation unit 42 calculates, in order to cause motions of the robot in accordance with a program, command values for giving the robot 10 a desired position or speed of each of the drive axes by taking into account the error parameters stored in the parameter storage unit 41. That is, the command value calculation unit 42 calculates such command values that the program requests a position calculated using the error parameters (calculated position), which in other words is a position obtained by correcting for the theoretical position using the error parameters.

The position information acquisition unit 43 acquires position information indicating the actually measured position (actual position) of the reference point at the distal end of the robot 10, based on the relative positions of the target marks 30 to the measurement device 20 measured by the measurement device 20 and the coordinate positions of the target marks 30 in the user coordinate system. Specifically, based on the positions and the orientations of the target marks 30 measured by the measurement device 20 in a coordinate system of the measurement device 20, the position information acquisition unit 43 identifies the relationship between the coordinate system of the measurement device 20 and the user coordinate system for identifying the positions where the target marks 30 are fixed. The position information acquisition unit 43 then calculates a coordinate position of the measurement device 20, which is eventually determined as a coordinate position of the reference point at the distal end of the robot 10, in the user coordinate system through coordinate transformation of the coordinate positions of the target marks 30 in the coordinate system of the measurement device 20. The user coordinate system may be a reference coordinate system based on the location where the robot is placed.

The sensitivity calculation unit 44 calculates, for each of the error parameters, a sensitivity value that represents the magnitude (sensitivity) of a change in a calculatory position (calculated position) of the reference point with respect to a change in the error parameter. The sensitivity values may be independent evaluation scores, rankings, or rank values of grouped sensitivities.

Based on the sensitivity values calculated by the sensitivity calculation unit 44, the target selection unit 45 selects error parameters to be calculated by the parameter correction unit 46. The target selection unit 45 may select a specific number of error parameters in higher sensitivity value rankings or may select error parameters having a sensitivity greater than or equal to a specific value. The target selection unit 45 may also increase or decrease the number of error parameters to be selected, depending on the number of pieces of position information to be obtained based on, for example, a machining program.

The target selection unit 45 may select error parameters to be calculated, based on weights set for the respective error parameters and the sensitivity values calculated by the sensitivity calculation unit 44. Weighting the sensitivity values calculated by the sensitivity calculation unit 44 helps select appropriate error parameters more quickly, with a higher correction priority given to error parameters expected to have a greater impact in terms of the structure of the robot 10 as well as to error parameters having a greater impact at the time of the acquisition of the position information.

The parameter correction unit 46 corrects for the error parameters based on the command values outputted from the command value calculation unit 42 to the robot 10 and the position information acquired by the position information acquisition unit 43. The parameter correction unit 46 corrects only for correction target error parameters selected by the target selection unit 45, on an assumption that the error parameters other than the correction target error parameters have no impact on the position of the reference point of the robot 10.

In actuality, the robot 10 has a very complex mechanism. In order to reflect all error factors, therefore, it is necessary to use an extremely large number of error parameters. Since various factors, such as the structure of the work head 11 and motion patterns of the robot 10, affect the positioning error to be caused, appropriate values of the error parameters can vary depending on, for example, the mode of machining or the configuration of the machining program. In order to calculate right values for all of the error parameters, therefore, it is necessary to cause the robot 10 to make positioning motions with various motion patterns and acquire a large number of pieces of position information. In an example in which the robot 10 is a six-axis articulated robot, the number of combinations of necessary command values and position information exceeds 100.

The parameter correction unit 46 therefore analyzes the relationship between the command values and the actually measured position (actual position) of the reference point by assuming that only the error parameters selected by the target selection unit 45 are unknown variables to be calculated and the other error parameters are invariant (constant at the respective current values). Based on this analysis, the parameter correction unit 46 corrects for the values of the error parameters selected by the target selection unit 45 so that the actual position of the reference point can be calculated from the command values more accurately. This configuration makes it possible to yield, from a relatively small number of pieces of position information, a set of error parameters that are not necessarily exact but are effective enough to identify the position of the reference point of the robot 10 relatively accurately.

In the robot controller 40, the sensitivity calculation unit 44, the target selection unit 45, and the parameter correction unit 46 may perform their respective operations each time the position information is acquired. That is, each time the position information acquisition unit 43 acquires the position information, the sensitivity calculation unit 44 may recalculate the sensitivity values, the target selection unit 45 may re-select correction target error parameters, and the parameter correction unit 46 may correct for the error parameters. This configuration makes it possible to correct for the error parameters in stages to ensure that the error parameters are appropriate.

The evaluation unit 47 determines whether or not an offset between the calculated position of the reference point calculated using the error parameters and the actual position of the reference point indicated by the position information is within a predetermined range. If the evaluation unit 47 determines that the offset between the calculated position and the actual position of the reference point of the robot 10 is sufficiently small, the processing for correcting for the error parameters is stopped, so that the time required to obtain a set of effective error parameters can be reduced. The error parameter correction may be, for example, resumed when a predetermined event occurs, such as when the operation of the robot system 1 is stopped, when the machining program is changed, or when an emergency stop occurs.

The weight determination unit 48 determines weights depending on what has been done in a maintenance operation performed on the robot 10. The weight determination unit 48 may be therefore configured to receive an operator's input of what has been done in a maintenance operation. For example, in a case where a motor has been replaced, error factors related to the replaced motor can change, which can result in the need to significantly modify related error parameters. Thus, the weight determination unit 48 assigns a higher weight to the sensitivity values of error parameters that are likely to need a modification because of the maintenance operation, making it possible to quickly compensate for any positioning error resulting from the maintenance operation. The weights of the sensitivity values of error parameters may be held each time measurement data is obtained and switched between before and after the maintenance operation to calculate mechanism error parameters of the robot after the maintenance operation using the measurement data obtained before and after the maintenance operation.

The program creation unit 49 creates motion programs for causing the robot 10 to take a plurality of postures to allow the measurement device 20 to measure the target marks 30 from different directions. Specifically, the program creation unit 49 creates, based on received coordinate positions of the target marks 30, motion programs for sequentially changing postures of the robot 10 so that the measurement device 20 faces the target marks 30 from predetermined different directions at a fixed distance. The motion programs may be created so that the calculated position, which is calculated by taking into account the error parameters currently stored in the parameter storage unit 41, is equal to a coordinate position determined based on the coordinate positions of the target marks 30, or may be created so that the theoretical position calculated without taking into account the error parameters is equal to the coordinate position determined based on the coordinate positions of the target marks 30.

FIG. 2 shows procedures of the error parameter correction by the robot controller 40. The error parameter correction is implemented by a method including a motion program creation step (Step S1), a positioning step (Step S2), a sensitivity value calculation step (Step S3), a correction target selection step (Step S4), a position information acquisition step (Step S5), a parameter correction step (Step 36), and an evaluation step (Step S7).

In the motion program creation step, which is Step S1, the program creation unit 49 creates motion programs based on the coordinate positions of the target marks 30.

In the positioning step, which is Step S2, the command value calculation unit 42 calculates command values for positioning the robot 10 in accordance with a calibration program created by the program creation unit 49.

In the sensitivity value calculation step, which is Step S3, the sensitivity calculation unit 44 calculates sensitivity values respectively for all error parameters based on the command values and position information.

In the correction target selection step, which is Step S4, the target selection unit 45 selects, as correction target error parameters, error parameters in higher sensitivity value rankings.

In the position information acquisition step, which is Step S5, the position information acquisition unit 43 acquires position information of the reference point of the robot 10. In other words, the position information acquisition unit 43 measures the three-dimensional position of the reference point.

In the parameter correction step, which is Step S6, the parameter correction unit 46 corrects for the error parameters selected in the correction target selection step so that the calculated position is closer to the actual position. In other words, the parameter correction unit 46 modifies the values of the error parameters stored in the parameter storage unit 41.

In the evaluation step, which is Step S7, the evaluation unit 47 evaluates whether or not an offset between the calculated position of the reference point of the robot 10, which is calculated using the error parameters currently stored in the parameter storage unit 41 based on the command values calculated by the command value calculation unit 42, and the actual position of the reference point, which is indicated by the position information acquired by the position information acquisition unit 43, is within the predetermined range. If the offset between the calculated position and the actual position is within the predetermined range, the error parameters stored in the parameter storage unit 41 are considered appropriate, and the processing is ended. If the offset between the calculated position and the actual position is not within the predetermined range, the processing returns to Step S2 to position the robot 10 in accordance with a next instruction from the calibration program. Then, the subsequent steps are re-performed. As described above, Steps S2 to S6 are repeated to repeat the error parameter correction with new information acquired each time. Thus, the error parameters can be modified to more appropriate values, and the positioning accuracy of the robot can be progressively increased.

As described above, the robot system 1 corrects for error parameters using the relative positions between the measurement device 20 attached to the distal end of the robot 10 and the target marks 30 whose positions are identified in the user coordinate system. It is therefore possible to easily set error parameters with which the position of the reference point of the robot 10 can be accurately calculated, while achieving a relatively simple configuration.

Since the program creation unit 49 creates motion programs for specifying optimal postures of the robot 10 for the error parameter correction, the robot system 1 can correct for error parameters efficiently.

Since the robot controller 40 uses, as correction target error parameters, only a small number of error parameters selected by the target selection unit 45, the robot system 1 can obtain relatively accurate error parameters using a relatively small number of pieces of position information. That is, the robot system 1 can increase the positioning accuracy of the robot 10 relatively easily.

While an embodiment of the robot system according to the present disclosure has been described above, the scope of the present disclosure is not limited to the foregoing embodiment. The aforementioned effects of the foregoing embodiment are merely a list of the most preferable effects resulting from the robot system according to the present disclosure. Effects that are produced by the robot system according to the present disclosure are not limited to the aforementioned effects of the foregoing embodiment.

The robot system according to the present disclosure may correct for error parameters based on a plurality of pieces of position information, rather than correcting for error parameters each time position information is acquired.

The robot system according to the present disclosure may select correction target error parameters from among preset candidates without using sensitivity values. The robot system according to the present disclosure may analyze all error parameters as unknown variables without limiting the analysis to the correction target error parameters.

The robot system according to the present disclosure may be given a motion program for the error parameter correction by a user, and may continue to correct for error parameters until the motion program ends, omitting the evaluation by the evaluation unit.

EXPLANATION OF REFERENCE NUMERALS

1: Robot system
10: Robot
11: Work head
20: Measurement device
30: Target mark
40: Robot controller
41: Parameter storage unit
42: Command value calculation unit
43: Position information acquisition unit
44: Sensitivity calculation unit
45: Target selection unit
46: Parameter correction unit
47: Evaluation unit
48: Weight determination unit
49: Program creation unit

The invention claimed is:

1. A robot system comprising:
a robot having a plurality of drive axes;
a measurement device attached to a distal end of the robot;
a target mark fixed in a workspace of the robot; and
a robot controller configured to control the robot,
the robot controller including:
a parameter storage unit configured to store therein a plurality of error parameters to be used to calculate a position of a reference point at the distal end of the robot;
a command value calculation unit configured to calculate command values for giving the robot a desired position or speed of each of the drive axes by taking into account the error parameters;
a position information acquisition unit configured to acquire position information of the reference point based on a relative position of the target mark to the measurement device measured by the measurement device and a coordinate position of the target mark in a user coordinate system for specifying motions of the robot; and
a parameter correction unit configured to correct for the error parameters based on the command values and the position information;
wherein the robot controller further includes:
a sensitivity calculation unit configured to calculate, for each of the error parameters, a sensitivity value that represents magnitude of a change in a calculatory position of the reference point with respect to a change in the error parameter; and
a target selection unit configured to select, based on the sensitivity values, correction target error parameters from among the plurality of error parameters, and
wherein the parameter correction unit configured to correct for the correction target error parameters based on the command values for the robot and the position information, on an assumption that the error parameters other than the correction target error parameters have no impact on the position of the reference point.

2. The robot system according to claim 1, comprising a plurality of the target marks that are distributed.

3. The robot system according to claim 1, wherein
the target mark has a shape or pattern that allows the measurement device to recognize an orientation of the target mark.

4. The robot system according to claim 1, wherein
the robot controller further includes a program creation unit configured to create a plurality of motion programs for specifying postures of the robot to allow the measurement device to measure the target mark from different directions.

5. The robot system according to claim 1, wherein
the robot controller further includes a weight determination unit configured to determine weights of the sensitivity values depending on what has been done in a maintenance operation performed on the robot.

6. The robot system according to claim 1, wherein
the robot controller further includes an evaluation unit configured to determine whether or not an offset between the position of the reference point calculated using the error parameters and a position of the reference point indicated by the position information is within a predetermined range.

* * * * *